United States Patent [19]

Veregin et al.

[11] Patent Number: 5,610,250

[45] Date of Patent: *Mar. 11, 1997

[54] POLYMERIZATION PROCESSES

[75] Inventors: Richard P. N. Veregin; Peter M. Kazmaier, both of Mississauga; Michael K. Georges, Guelph; Gordon K. Hamer, Mississauga, all of Canada

[73] Assignee: Xerox Corporation, Stamford, Conn.

[*] Notice: The term of this patent shall not extend beyond the expiration date of Pat. No. 5,530,079.

[21] Appl. No.: 620,728

[22] Filed: Mar. 25, 1996

Related U.S. Application Data

[62] Division of Ser. No. 367,636, Jan. 3, 1995, Pat. No. 5,530,079.

[51] Int. Cl.$^6$ ........................................................ C08F 2/38
[52] U.S. Cl. ...................... 526/219.3; 526/204; 526/210; 526/212; 526/218.1; 526/329.2; 526/347
[58] Field of Search ................................. 526/219.3, 212, 526/204, 210, 329.2, 347, 218.1

[56] References Cited

U.S. PATENT DOCUMENTS

| | | | |
|---|---|---|---|
| 3,600,169 | 8/1971 | Lawton | 96/1.5 |
| 5,322,912 | 6/1994 | Georges | 526/204 |

*Primary Examiner*—Fred Zitomer
*Attorney, Agent, or Firm*—John L. Haack

[57] ABSTRACT

A polymerization process comprising: heating a mixture comprised of a free radical initiator, a stable free radical agent, at least one polymerizable monomer compound, and optionally a solvent, to form a polymer with a high monomer to polymer conversion and a narrow polydispersity, wherein said polymer is comprised of a covalently bound free radical initiator fragment at one end and a covalently bound stable free radical compound at the other end of the polymer, and wherein said stable free radical agent has high thermal, acidic, and photochemical stability.

16 Claims, 1 Drawing Sheet

POLYMERIZATION PROCESSES

This is a division, of application Ser. No. 08/367,636, filed Jan. 3, 1995, U.S. Pat. No. 5,530,079.

CROSS REFERENCE TO COPENDING APPLICATIONS AND ISSUED PATENTS

Attention is directed to commonly owned and assigned U.S. Pat. No. 5,322,912, issued Jun. 21, 1994, entitled "POLYMERIZATION PROCESSES AND THEIR TONER COMPOSITIONS THEREFROM", wherein there is disclosed free radical polymerization processes for the preparation of a thermoplastic resin or resins comprising: heating from about 100° C. to about 160° C. a mixture comprised of a free radical initiator, a stable free radical agent, and at least one polymerizable monomer compound to form the thermoplastic resin or resins with a high monomer to polymer conversion and a narrow polydispersity; and U.S. Pat. No. 5,312,704, issued May 17, 1994, entitled "MONOMODAL, MONODISPERSED TONER COMPOSITIONS AND IMAGING PROCESSES", wherein there is illustrated a toner composition comprised of pigment particles, and a resin comprised of a monomodal polymer resin or monomodal polymer resin blends and wherein the monomodal resin or resin blends possess a narrow polydispersity.

Attention is directed to commonly owned and assigned copending applications Application Numbers, U.S. Ser. No. 08/181,134, filed Jan. 4, 1994 U.S. Pat. No. 5,401,804; U.S. Ser. No. 08/307,192, filed Mar. 25, 1993; continuation-in-part of U.S. Ser. No. 07/976,604, filed Nov. 16, 1992 U.S. Pat. No. 5,322,912, U.S. Ser. No. 08/214,518, filed Mar. 18, 1994, entitled "EMULSION POLYMERIZATION PROCESSES AND TONER COMPOSITIONS THEREFROM"; U.S. Ser. No. 08/223,418, filed Apr. 4, 1994, entitled "AQUEOUS POLYMERIZATION PROCESSES"; U.S. Ser. No. 08/242,490, filed May 13, 1994 U.S. Pat. No. 5,412,047, entitled "ACRYLATE POLYMERIZATION PROCESSES" wherein there are disclosed improved stable free radical moderated polymerization processes for the preparation of homo- and copolymeric resins containing contiguous acrylate or homoacrylate segments by employing an oxo derivative of the cyclic nitroxide compound TEMPO; U.S. Ser. No. 08/317,044, filed Oct. 3, 1994 U.S. Pat. No. 5,545,504, entitled "INK JETTABLE TONER COMPOSITIONS AND PROCESSES FOR MAKING AND USING"; and U.S. Ser. No. U.S. Ser. No. 08/345,371, filed Nov. 18, 1994, entitled "PROCESS FOR PRODUCING THERMOPLASTIC RESIN POLYMERS".

The disclosures of the above mentioned patents and copending applications are incorporated herein by reference in their entirety.

BACKGROUND OF THE INVENTION

The present invention is generally directed to processes for the preparation of homopolymers and copolymers. More specifically, the present invention relates to improved polymerization processes which provide homopolymer and copolymer resin products which possess narrow polydispersity properties and which polymerization processes proceed with high monomer to polymer conversion. In particular, this invention relates to improved stable free radical mediated or pseudoliving polymerization processes which yield homopolymers and copolymers having number average molecular weights ($M_n$) above about 100 to about 1,000 and having a polydispersity ratio of the weight average molecular weight ($M_w$) to the number average molecular weight ($M_n$) of from about 1.0 to about 2.0 and which processes accomplished in accordance with the present invention provide numerous operational and economic advantages associated therewith.

The present invention provides in embodiments a pseudoliving polymerization process that enables the synthesis of narrow polydispersity homopolymer and copolymer resins from a variety of free radical reactive monomers. The process can, in embodiments, use known free radical initiators in combination with specific non-nitroxide type stable free radical agent compounds and free radical reactive monomers to afford narrow polydispersity thermoplastic resins or elastomers.

The free radical initiator compounds selected must satisfy certain maximum half-life requirements for the purpose of providing efficient and highly controlled polymer chain initiation. The stable free radical agent compounds selected must satisfy certain stability requirements including high thermal stability, and high resistance to degradation by acids or photochemical means. The non-nitroxyl type stable free radical compounds must not initiate nor excessively inhibit or retard desired polymerization processes. The stable free radical agent compounds selected must also satisfy certain bond energy and steric hindrance requirements when the stable free radical agent compound is attached to the end of the propagating polymer chain.

In other embodiments the polymerization processes of the present invention can be used to prepare block copolymers and multi-block polymer having narrow polydispersity properties wherein at least one of the blocks is optionally water soluble thereby providing, for example, a means for preparing surface active or surfactant materials having well defined polydispersity and hydrophobe-lipophobe balance (HLB) properties.

Many polymerization processes used for the synthesis of narrow polydispersity resins, such as anionic, cationic, and group transfer polymerization processes, are severely limited by the need for anhydrous reaction conditions and monomers which do not contain protic or reactive functional groups, for example, hydroxy (OH) carboxy ($CO_2H$), amino (NH), and the like. As a consequence, these processes are not readily applicable to the polymerization of functionalized monomers since these monomer materials tend to be hydroscopic and any associated water may readily destroy the polymerization initiator component, for example, the hydrolysis or protonation of organolithium reagents by the monomer in anionic polymerization processes, or in other ways cause the polymerization to fail entirely or to be industrially inefficient.

It is generally accepted that known anionic and cationic polymerization processes used for the preparation of narrow polydispersity resins, block and multiblock polymers are not believed possible in aqueous or protic solvent containing polymerization media, or the aforementioned protonic or reactive functional groups, reference the aforementioned U.S. Pat. No. 5,312,704.

Of the known polymerization processes a preferred way to prepare polymers or copolymers having a narrow molecular weight distribution or polydispersity is by anionic processes. The use and availability of resins having narrow polydispersities in industrial applications is limited because anionic polymerization processes must be performed in the absence of atmospheric oxygen and moisture, require difficult to handle and hazardous initiator reagents, and consequently such polymerization processes are generally limited to small batch reactors. In addition, the monomers and solvents that are used must be of high purity and anhydrous thereby rendering the anionic process more expensive than alternatives which do not have these requirements. Thus, anionic polymerization processes are difficult and costly. It is desirable to have free radical polymerization process that provides narrow molecular weight distribution homoacrylate containing resins that overcomes the shortcomings and disadvantages of the aforementioned anionic polymerization processes.

Similarly, group transfer polymerization (GTP) processes have limitations and disadvantages, such as anhydrous reaction conditions and expensive reagents, which disadvantage GTP processes particularly for large scale industrial applications.

Free radical polymerization processes are generally chemically less sensitive than anionic processes to impurities in the monomers or solvents typically used and are substantially or completely insensitive to water. There has been a long felt need for an economical free radical polymerization process which is suitable for preparing narrow polydispersity resins in the presence of water.

Conventional free radical polymerization processes that are used to polymerize monomers in general, and functionalized monomers in particular inherently give broad polydispersity resin products or require that sophisticated processing conditions and materials handling protocols be employed.

The present invention, in embodiments, enables the preparation of homopolymers, random copolymers, block and multiblock copolymers, and polymer blends, with operator selectable molecular weight and polydispersity properties, and which preparation was heretofore not achievable in stable free radical moderated, free radical initiated polymerization systems.

The polymer resins produced by processes of the present invention, in embodiments, can be, if desired, essentially monomodal, that is the molecular weight distribution is narrow and indicative of a Poisson character and without shoulders or side bands. In embodiments, by repeating the heating step, comprising the combined initiation and polymerization step, there is provided a means for obtaining monomodal mixtures of polymer resins that are compositionally the same resin type having characteristics of both narrow polydispersity and known or selectable modality greater than 1.

In embodiments, processes of the present invention provide a means for conducting pseudoliving free radical polymerization processes on multi kilogram or larger scales. The aforementioned embodiments may be accomplished in a one or single pot reactor environment. In embodiments, polymeric chain growth proceeds by a pseudoliving mechanism and can provide resins of variable molecular weights from very low to very high, for example, less than about 2,000 up to about 200,000 while maintaining narrow molecular weight distributions or polydispersities. In embodiments, block and multiblock copolymers can be synthesized by the aforementioned stable free radical moderated polymerization processes wherein each block formed is well defined in length by the sequentially added and reacted monomer and wherein each additional block that is formed also possesses a narrow molecular weight distribution.

Polymerization processes known in the art proceed by a free radical mechanism providing resins of broad polydispersities and generally high molecular weights. The present invention relates to polymerization processes that proceeds via a pseudoliving free radical mechanism and provide resins of high, intermediate, or low molecular weights and with narrow polydispersities. The present invention provides polymer products with a latent thermally reactive or latent functional group on at least one end of the polymer which can be used for further reaction to prepare other resins with complex architectures. The present invention, in embodiments, provides polymerization processes that enable control of resin molecular weight, weight distribution, modality of the products, and the like properties.

The present invention is directed in embodiments to pseudoliving polymerization processes which permit the economic preparation of narrow polydispersity resins with low, intermediate, or high molecular weights. The low molecular weight resins can be prepared without a chain transfer agent or molecular weight modifier by, for example, selecting appropriate ratios of reactants, which provides several advantages over conventional chain transfer mediated polymerization processes.

Copolymers prepared by conventional free radical polymerization processes inherently have broad molecular weight distributions or polydispersities, generally greater than about four. One reason is that most free radical initiators selected have half lives that are relatively long, from several minutes to many hours, and thus the polymeric chains are not all initiated at the same time and which initiators provide growing chains of various lengths at any time during the polymerization process. Another reason is that the propagating chains in a free radical process can react with each other in processes known as coupling and disproportionation, both of which are chain terminating and polydispersity broadening reaction processes. In doing so, chains of varying lengths are terminated at different times during the reaction process which results in resins comprised of polymeric chains which vary widely in length from very small to very large and thus have broad polydispersities. If a free radical polymerization process is to be enabled for producing narrow molecular weight distributions, then all polymer chains must be initiated at about the same time and premature termination by coupling or disproportionation processes must be avoided or eliminated.

Practitioners in the art have long sought an inexpensive, efficient and environmentally efficacious means for producing polymers having operator controllable or selectable molecular weight properties, and further, processes which selectively afford a wide variety of different polymer product types and have narrow molecular weight distribution properties.

In the aforementioned U.S. Pat. No. 5,322,912 there is disclosed free radical polymerization processes for the preparation of a thermoplastic resin or resins comprising: heating from about 100° to about 160° C. a mixture comprised of a free radical initiator, a stable free radical agent, and at least one polymerizable monomer compound to form the thermoplastic resin or resins with a high monomer to polymer conversion and a narrow polydispersity. A broad spectrum of free radical reactive monomers are suitable for use in the highly versatile polymerization process. While the use of acidic promoter compounds disclosed therein enabled the stable free radical mediated polymerization reactions to proceed at industrially acceptable rates, for example, at temperatures of from about 100° to about 160° C., the use of acidic promoter compounds in conjunction with nitroxide or nitroxyl type stable free radical compounds was compromised by one or more competing acid promoted side reactions, for example, degradation of the nitroxyl stable free radical compound, with the result that the costly nitroxide stable free radical compound was being unnecessarily consumed and was being diverted and precluded from an exclusively productive role in the polymerization process, and wherein the exclusively productive role is that of a stable free radical moderating agent and as a thermally labile end group or blocking group in pseudoliving polymerization processes.

The following patents are of interest to the background of the present invention, the disclosures of which are incorporated by reference herein in their entirety:

In European Patent Publication 349,270 B1, filed Jun. 6, 1988 (US), is disclosed a pressure-sensitive adhesive composition characterized by comprising: a block copolymer represented by the general formula I(BAT)$_n$ wherein I represents the free radical initiator portion of an iniferter to the formula I(T)$_n$; T represents the termination portion of said iniferter; n is an integer of at least 2; and B represents an elastic acrylic polymer block having a glass transition temperature of at least 30° C. wherein said A-block is formed of a monomer selected from the group consisting of methyl methacrylate, polystyrylethyl methacrylate, macromer, methyl methacrylate macromer, acrylic acid, acrylonitrile, isobornyl methacrylate, N-vinyl pyrrolidone, and mixtures thereof, the weight ratio of said B-block to said A-block in said block copolymer being from 95:5 to 50:50; and 0 to 150 parts by weight tackifier per 100 parts block copolymer. Also disclosed is a method of making the pressure sensitive adhesive which relies upon mixing and exposing an iniferter of the formula I(T)$_n$ to an energy source in the presence of a sequence of monomer charges.

U.S. Pat. No. 4,581,429 to Solomon et al., issued Apr. 8, 1986, discloses a free radical polymerization process which controls the growth of polymer chains to produce short chain or oligomeric homopolymers and copolymers including block and graft copolymers. The process employs an initiator having the formula (in part) =N—O—X, where X is a free radical species capable of polymerizing unsaturated monomers. The molecular weights of the polymer products obtained are generally from about 2,500 to 7,000 having polydispersities generally of about 1.4 to 1.8, at low monomer to polymer conversion. The reactions typically have low conversion rates and use relatively low reaction temperatures of less than about 100 degrees C., and use multiple stages.

European Patent Publication No. 0135280 corresponding to European Patent Application No. EP 84 304,756 is the European Patent Office equivalent of the aforementioned U.S. Pat. No. 4,581,429.

In *Polymer Preprints,* 35 (1), 778 (1994), Matyjaszewski et al., is disclosed thermal polymerizations of styrene monomers in the presence of stable radicals and inhibitors, but without a free radical initiator present, such as peroxide or azo compounds.

In U.S. Pat. No. 5,268,437, to Holy, issued Dec. 7, 1993, discloses a high temperature aqueous processes for the polymerization of monoethylenically unsaturated carboxylic monomer to produce low molecular weight, water-soluble polymer products useful as detergent additives, scale inhibitors, dispersants and crystal growth modifies. Suitable monomers include acrylic acid, methacrylic acid, maleic acid, maleic anhydride, crotonic acid, and itaconic acid. The reactions are run at temperatures ranging from about 130° to 240° C., preferably from about 140° to about 230° C., with polydispersities less than 2.5. The process can be continuous, semicontinuous, or batch.

In U.S. Pat. No. 4,546,160, to Brand et al., issued Oct. 8, 1985, is disclosed a process to continuously bulk polymerize acrylic monomers to prepare low molecular weight, uniform polymers employing minor amounts of initiator and, optionally solvents, at short residence times and moderate reaction temperatures to provide high yields of a product with polydispersities less than 3, suitable for high solids applications.

U.S. Pat. No. 5,059,657 to Druliner et al., issued Oct. 22, 1991, discloses a polymerization process for acrylic and maleimide monomers by contacting the monomers with a diazotate, cyanate or hyponitrite, and N-chlorosuccinimide, N-bromosuccinimide or a diazonium salt. The polymer produced can initiate further polymerization, including use in block copolymer formation.

U.S. Pat. No. 4,736,004 to Scherer, Jr. et al., issued Apr. 5, 1988, discloses novel persistent perfluorinated free radicals which, upon thermal decomposition, yield free radical species which can be used to polymerize polymerizable monomers containing ethylenic unsaturation.

U.S. Pat. No. 3,600,169 to Lawton, issued Aug. 17, 1971, discloses an electrostatic light sensitive reproduction sheet employing a composition comprising in an insulating resinous binder an organic stable free radical and a precursor sensitive to light to be converted to transient free radicals reactive with the stable free radical to change the conductance of the sheet so that an electrostatic image can be formed. Also disclosed is an extensive listing of stable free radical compounds.

Other references cited in an international search report for the aforementioned commonly owned U.S. Pat. No. 5,322,912 are: *J. Am. Chem. Soc.,* 1983, 5706–5708; *Macromol.,* 1987, 1473–1488; *Macromol.,* 1991, 6572–6577; U.S. Pat. No. 4,628,019 to Suematsu et al., issued Aug. 10, 1986; U.S. Pat. No. 3,947,078 to Crystal, issued Aug. 10, 1976; and U.S. Pat. No. 3,965,021 to Clemens et al., issued Jun. 22, 1976. The cited references disclose alternative means, as discussed above such as anionic, group transfer, and the like, for preparing polymer resins with narrow polydispersity properties, but which alternative means do not provide the convenience and economic improvements of the present invention.

One known method of achieving control of polymer molecular weight is through the use of efficient chain transfer agents, but this approach has several drawbacks. This approach irreversibly incorporates the structure of the chain transfer agent into the polymer chain. This can be undesirable since that structure will have an increasing effect on the properties of the polymer as molecular weight decreases. Furthermore, the chain transfer agents commonly employed are mercaptans. These materials are expensive and have objectionable odors associated with their presence. Other common chain transfer agents are hypophosphites, bisulfites, halogenated hydrocarbons such as carbon tetrabromide, and alcohols. These also add to the cost of the process, introduce undesired functionally or properties to the polymer, can introduce salts into the product, and may necessitate an additional product separation step to remove the chain transfer agent from the reaction mixture.

Another way of lowering the molecular weight of the polymer product is by increasing the amount of free radical initiator. This approach adds considerably to the cost of production and may result in polymer chain degradation, crosslinking, and high levels of unreacted initiator remaining in the product. In addition, high levels of initiator may also result in high levels of salt by-products in the polymer mixture which is known to be detrimental to polymer performance in many applications. The same is true for chain stopping agents such as sodium metabisulfite.

High levels of metal ions together with high levels of free radical initiator have also been tried as means for controlling molecular weight. This method is taught in U.S. Pat. No. 4,314,044 where the ratio of initiator to metal ion is from about 10:1 to about 150:1 and the initiator is present from about 0.5 to about 35 percent based on the total weight of the monomers. Such an approach is unsuitable for some products, such as water treatment polymers, which can not tolerate metal ion contaminants in the polymer product. In addition, the product is usually discolored due to the presence of the metal ions. Thus, polymerization processes which produce product polymers containing residual non-polymeric materials may be significantly negatively compromised with respect to, for example, appearance, performance and toxicity properties. Polymeric processes which create or contain non-polymeric residual materials are preferably avoided.

The following references are also of interest: U.S. Pat. Nos. 3,682,875; 3,879,360; 3,954,722; 4,201,848; 4,542,182; 4,581,429; 4,777,230; 5,059,657; 5,173,551; 5,191,008; 5,191,009; 5,194,496; 5,216,096; and 5,247,024.

In polymerization reaction processes of the prior art, various significant problems exist, for example difficulties in predicting or controlling both the polydispersity and modality of the polymers produced. These polymerization processes produce polymers with high weight average molecular weights ($M_w$) and low number average molecular weights ($M_n$) resulting in broad polydispersities or broad molecular weight distribution ($M_w/M_n$) and in some instances low conversion. Further, polymerization processes of the prior art, in particular free radical processes, are prone to generating excessive quantities of heat since the polymerization reaction is exothermic. As the viscosity of the reaction medium increases dissipation of heat becomes more difficult. This is referred to as the Trommsdorff effect as discussed and illustrated in *Principles of Polymerization*, G. Odian, 2nd Ed., Wiley-Interscience, N.Y., 1981, page 272, the disclosure of which is entirely incorporated herein by reference. This is particularly the situation for reactions with high concentrations of soluble monomer, for example greater than 30 to 50 percent by weight soluble monomer, which are conducted in large scale reactors with limited surface area and limited heat dissipation capacity. Moreover, the exothermic nature of free radical polymerization processes is often a limitation that severely restricts the concentration of reactants or the reactor size upon scale up.

Further, gel body formation in conventional free radical polymerization processes may result in a broad molecular weight distributions and/or difficulties encountered during filtering, drying and manipulating the product resin, particularly for highly concentrated reactions.

These and other disadvantages are avoided, or minimized with the homopolymeric and copolymeric polymerization processes of the present invention.

Thus, there remains a need for polymerization processes for the preparation of narrow polydispersity polymeric resins by economical and scalable free radical polymerization techniques and which polymers retain many or all of their desirable physical properties, for example, hardness, low gel content, processibility, clarity, high gloss durability, and the like, while avoiding the problems of gel formation, exotherms, volume limited and multi-stage reaction systems, complex purification, encumbered or comprised performance properties due to undesired residuals or broad polydispersity properties of the polymer resin products, and the like, associated with prior art free radical polymerization methodologies.

There also remains a need for improved stable free radical moderated polymerization processes wherein specifically selected stable free radical agent compounds are employed for controlling polymerization processes, for imparting greater stability to the polymer products and to the reaction process, and which improved stable free radical agent compounds and polymerization processes overcome the aforementioned limitations and problems.

The polymerization processes and the resultant thermoplastic resin and elastomer products of the present invention are useful in many applications, for example, as a variety of specialty applications including toner and liquid immersion development ink resins or ink additives used for electrophotographic imaging processes, or where monomodal or mixtures of monomodal narrow molecular weight resins or block copolymers with narrow molecular weight distribution within each block component are suitable, for example, in thermoplastic films, electrophotographic marking materials such as toners and toner additives, and aqueous or organic solvent borne coating technologies.

SUMMARY OF THE INVENTION

An object of the present invention is to provide improved stable free radical agent moderated polymerization processes or pseudoliving polymerization processes and polymers therefrom that overcome many of the problems and disadvantages of the aforementioned prior art.

In another object of the present invention is provided improved stable free radical moderated polymerization processes for the preparation of thermoplastic resins and elastomers.

In another object of the present invention is provided, in embodiments, a polymerization process for the preparation of thermoplastic resins or elastomers comprising heating a mixture comprised of a free radical initiator, a stable free radical agent, at least one polymerizable monomer compound, and optionally a solvent, to form the thermoplastic resin or elastomer polymer product with a high monomer to polymer conversion and a narrow polydispersity, wherein said product is comprised of a covalently bound free radical initiator fragment at one end and a covalently bound stable free radical compound at the other end of the product, and wherein said stable free radical agent has improved thermal, acidic, and photochemical stability as a discrete molecular entity and as an end group bound to the polymer product.

It is also an object of the present invention to provide thermoplastic and elastomer polymerization processes for the production of diblock and multiblock polymers with high monomer to polymer conversion and narrow polydispersity properties.

It is a further object of the present invention to provide thermoplastic resin and elastomer polymerization processes which do not require the use of water or organic solvents, or chain transfer agents as a means of controlling the molecular weight of the resulting polymers.

Another object of this invention is to provide polymerization processes which result in narrow polydispersity thermoplastic and elastomer resin products having number average molecular weights above about 1,000.

Another object of this invention is to provide thermoplastic resin and elastomer mixtures having number average molecular weights above about 1,000 to about 200,000 and a polydispersity within the range of from about 1.0 to about 2.0 and which polydispersities are easily selectable and controllable by an operator.

Another object of this invention is to provide a polymer or polymer mixtures having sufficiently low polydispersity properties and high monomer conversions such that residual monomer levels are low and are within industrially acceptable levels so as to avoid additional monomer removal or recovery steps.

Another object of the present invention is to provide a polymerization reaction system which affords narrow polydispersity homopolymeric or copolymeric thermoplastic resin products in high yield.

Another object of the present invention is to provide a polymerization reaction system which may be conducted in the presence of a minimum amount of conventional reaction media such as water and mixtures of water and water miscible organic solvents.

In yet another object of the present invention, coupling or disproportionation termination reactions are substantially minimized or eliminated by reversibly terminating the propagating free radical chains with selected stable free radical agent compounds having preferred stability properties, for example, a sterically hindered phenoxy or phenoxide derived stable free radical agent, which both enables and serves to moderate the exothermicity and modality properties of the polymerization processes.

In another object of the present invention is provided the acceleration of the dissociation of free radical peroxide initiator compounds by the addition of dissociation promoter compounds which include, for example, tertiary amines, which compounds ensure that all polymeric chains are initiated nearly simultaneously or at about the same time very early on in the polymerization process.

In another object of the present invention is the addition of small amounts of organic or inorganic acids, for example, organic sulfonic and carboxylic acids, to the reaction medium to alter the normal rate of unsaturated monomer reaction without significantly broadening the polydispersity of the polymeric resins and without inducing autopolymerization effects.

Still another object of the present invention is to prepare water soluble thermoplastic resins or elastomers by single pot processes employing suitable monomer or monomers, free radical initiator, optional minimal amounts of an emulsifier or surfactant which may provide rate enhancement or simplify isolation, but avoids emulsification or phase separation during the polymerization, and certain sterically hindered and highly stabilized stable free radical agent compounds having particularly high thermal, acidic, and photochemical stability, and which stabilized stable free radical compounds form thermally labile bonds with propagating polymeric free radical species wherein the aforementioned thermally labile bond is labile at temperatures above of from about 100° to 250° C.

Another object of the present invention is to prepare thermoplastic resins and elastomers using polymerization processes wherein the molecular weight of the growing polymer or copolymer chains increase over the entire time period of the polymerization reaction and wherein the percent conversion or degree of polymerization of monomer to polymer with respect to time or number average molecular weight is approximately linear, that is, polymerization processes which occur without the aforementioned Trommsdorff effect.

Moreover, another object of the present invention is to provide polymerization processes for the preparation of thermoplastic resins and elastomers with narrow polydispersity properties and which polymerization processes are accomplished in a time efficient and economic manner by the optional addition of dialkyl sulfoxides promoter compounds, such as dimethyl sulfoxide (DMSO), and which promoter compounds enable a greater narrowing of the polymer product polydispersity during product formation. The dialkyl sulfoxide additives are preferably liquid at the polymerization reaction temperature and may be used in amounts from about several tenths of a weight percent of the total reaction mixture, to use in amounts as the exclusive reaction solvent or reaction media, for example, in excess of 95 percent by weight of the monomer being polymerized.

In another object of the present invention is provided stable free radical polymerization processes wherein improved levels of free radical initiator efficiency and efficacy are realized and result from the reaction of, for example, benzoyl radicals with a stable free radical precursor compound such as a hindered phenol to produce a stable free radical agent phenoxyl radical in situ without the need for preparing the stable free radical compound in a separate or additional step.

In yet another object of the present invention is provided, in embodiments, a thermoplastic polymer resin or elastomer of the formula I—(M)$_n$—SFR wherein I is a covalently bonded free radical initiator fragment, (M)$_n$ is at least one contiguous polymeric segment comprised of at least one free radical polymerized monomer compound M, n is an integer from about 10 to about 20,000 and represents the total number monomer units contained in the polymeric segment, and SFR is a covalently bonded stable free radical agent, wherein the stable free radical agent possesses high thermal stability, high acid stability, high photochemical stability, and low toxicity.

In still yet another object of the present invention is provided, in embodiments, a thermoplastic polymer resin or elastomer containing a covalently bound stable free radical terminal group which possesses high reactivity and high dissociability with propagating free radical polymeric species and is comprised of a sterically hindered stable free radical bearing atom, such as highly substituted organic hydrazyls, organic verdazyls, pyridinyl compounds, organic aroxyls, aryl alkyls and aryl cycloalkyls in which the unpaired electron is on a carbon atom in the alkyl or cycloalkyl group, and mixtures thereof.

Other objects of this invention will be apparent to those skilled in the art in light of the present disclosure and appended claims.

DETAILED DESCRIPTION OF THE INVENTION

Figure 1:
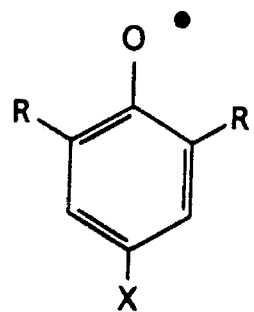
FIG. 1 illustrates an exemplary substituted and sterically hindered phenoxy radical compound useful as a stable free radical agent in the present invention.
Figure 2:
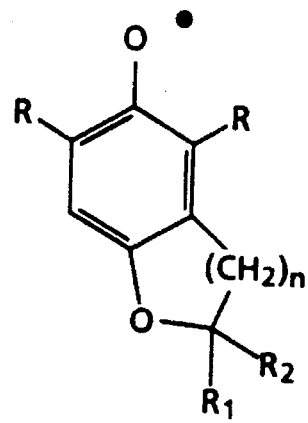
FIG. 2 illustrates an exemplary substituted and sterically hindered tocopherol radical compound useful as a stable free radical agent in the present invention.
Figure 3:
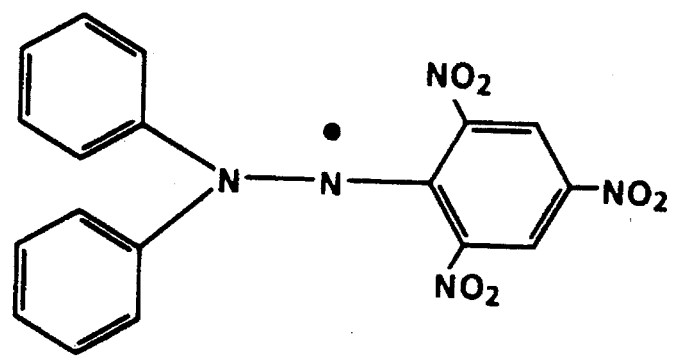
FIG. 3 illustrates an exemplary substituted and sterically hindered N-trinitrophenyl-N',N'-diphenyl hydrazine derivative radical compound useful as a stable free radical agent in the present invention.

The present invention provides improved stable free radical mediated polymerization processes for preparing polymers, such as thermoplastic resins or elastomeric materials with well defined molecular weight properties and narrow polydispersities. The processes can be run as batch, semi-continuous or continuous processes. The processes provide for from about 1 to about 99 percent by weight of the reaction mixture to be a free radical reactive monomer or monomer mixtures and the processes are conducted at from about 100° C. to about 250° C. The processes produce polymer products which have operator selectable low, intermediate, or high molecular weight; narrow polydispersity; low residual salt content or are salt free; posses greater thermal and acidic stability; substantially free of highly corrosive attributes and low toxicity.

In embodiments, the present invention overcomes many of the problems and disadvantages of the aforementioned related art polymerization processes by forming narrow polydispersity polymeric resins and wherein high conversion from monomer to polymer is achieved, for example, a polymerization process comprising heating a mixture comprised of a free radical initiator, a stable free radical agent, at least one polymerizable monomer compound, and optionally a solvent, to form the thermoplastic resin or elastomer polymer product with a high monomer to polymer conversion and a narrow polydispersity, wherein said product is comprised of a covalently bound free radical initiator fragment at one end and a covalently bound stable free radical compound at the other end of the product, and wherein said stable free radical agent has high thermal, acidic, and photochemical stability. The stable free radical compound when covalently bound to the polymer chain or product preferably has no unpaired electrons, that is, has no free radical character or free unpaired electrons.

"High thermal stability" refers to stable free radical compounds that do not undergo any apparent or substantial non-productive type thermal degradation, dissociation, or decomposition during the course of the polymerization reaction processes and subsequent optional isolation steps.

"High acid or acidic stability" refers to a stable free radical compound that does not undergo, to any significant extent, that is to any level which would depart form the objects of the present invention, any apparent or substantial acidic, acid catalyzed, or acid mediated degradation, dissociation, or decomposition to form a non free radical compound with the exception of being covalently bonded to the terminus of the polymeric chain, during the course of the polymerization process and subsequent optional isolation steps.

"High photochemical stability" as used herein is intended to indicate that the stable free radical compounds selected, in embodiments, of the present invention do not undergo to any significant extent, that is to a level which would depart form the objects of the present invention, any apparent or substantial photochemical, photon induced or catalyzed, photolysis, degradation, dissociation, or decomposition to form a non stable free radical compound with the exception of reversible bonding to or debonding from the terminus of the polymeric chain, and which reversible photochemical processes may occur during the course of the polymerization process or subsequent optional isolation steps.

Suitable stable free radical compounds for use in the present are known, and can be prepared prior to mixing with the other polymerization reactants or they may be generated in situ or on an as needed basis, reference for example, the non-nitroxyl type stable free radical compounds described in "Free Radicals" Volumes I and II, edited by J. K. Kochi, Wiley-Interscience, New York, 1973.

The stable free radical agent compounds of the present invention may be generated in any suitable fashion from the corresponding non-free radical precursor, for example, thermally, chemical, electrochemically, photolytically, mechanically, and the like methods.

Examples of suitable and preferred stable free radicals are disclosed in the aforementioned U.S. Pat. No. 3,600,169 to Lawton and include: nitrogen centered stable free radical such as organic hydrazyls, verdazyls, and pyridinyl compounds; non-nitroxide oxygen centered stable free radicals such as aroxyls and the like; and carbon centered stable free radicals such as aryl alkyls and aryl cycloalkyls with the unpaired electron residing on a carbon atom in the alkyl or cycloalkyl substituents.

The preferred stable free radical compounds selected for use in the present invention are chosen so as to enhance stability properties of the overall process and products therefrom by providing: stable free radical agent compounds with greater thermal, acidic, and photochemical stability; and polymeric products containing the aforementioned preferred or "stabilized" stable free radical compounds and which "stabilized" compounds, in turn impart greater thermal, acidic, and photochemical stability upon the polymeric products.

The term "stabilized" as used in the context of a stabilized stable free radical agent or compound of the present invention is intended to indicate that a bimolecular reaction of the stable free radical compound (SFR●) with another stable free radical compound (SFR●) of the same or similar type or identity, also known as bimolecular "self" reactions, to form a dimeric product (SFR—SFR) does not occur to any significant extent in the presence of free radical initiator (I●) species, free radical reactive monomers (M), or propagating polymeric chain free radical species (P●). "Stable" does not mean that the stable free radical compound (SFR●) will not react with any other molecule or other free radical, such as a propagating polymeric chain free radical (P●). On the contrary, the stable free radical compounds selected for use in the present invention must readily react, that is, with a rate that is faster than the rate of chain propagation and preferably at or near diffusion control, with the incipient or propagating free radical oligomeric or polymeric chains (P●) to be effective. The reverse reaction under the polymerization reaction conditions is believed be equally rapid.

C—O● based stable free radicals Sterically hindered phenoxy stable free radical species useful in the present invention can be conveniently generated in a heterogeneous manner by, for example, contacting a solution of the corresponding phenol with insoluble silver oxide or lead dioxide salts. Alternatively, the phenoxy radicals can be generated by mixing solutions of the corresponding phenol (Ar—OH) or hydroperoxide (Ar—O—OH) and cerium salt solutions, such as ceric ammonium sulfate or nitrate. The phenoxyl radicals are preferably prepared and used in the polymerization processes without by-product salts or unreacted phenol being present in substantial amounts.

In preferred embodiments, the sterically hindered phenoxy stable free radical compounds and related stable free radical compounds of the present invention, reference the Figures and the relevant disclosure of stable free radical compounds, also have bulky blocking substituents at one or both of the meta positions and preferably at the para position. Preferred bulky substituents are, for example, adamantyl (Ad—), sec-butyl (s-Bu—), substituted phenyl ($R_n$—Ph—), and the like groups. A particularly preferred bulky substituent is tertiary butyl ($Me_3C$— or t-Bu—) and is preferred because of the effectiveness of this substituent in preventing undesirable and counterproductive side reactions to the phenol aromatic nucleus, and the relative commercial availability and the relatively low cost of the material. Thus, a preferred phenoxy radical for use in the polymerization processes of the present invention is derived from the corresponding phenol of, for example, 2,6-di-tert-butyl-4-methylphenol, and a more preferred phenoxy radical is likewise derived from 2,4,6-tri-tert-butylphenol. Another preferred compound is 2,6-di-tert-butyl-alpha-(3,5-di-tert-butyl-4-oxo-2,5-cyclohexadien-1-ylidene)-p-tolyoxy free radical which is the known galvinoxyl stable free radical.

C● based stable free radicals Other preferred stable free radicals are those based on hindered substituted triphenyl methane compounds, and the like compounds, and more preferably those substituted by electron-donating substituents, as for example, methoxy groups, and more preferably where such substituents are at the ortho or para position to the radical bearing substituent or site.

N● based stable free radicals Other preferred stable free radicals are those based on hindered substituted triphenyl amines, and more preferably those substituted by electron-donating substituents, as for example, methoxy groups, and more preferably where such substituents are at the ortho or para position to the radical bearing substituent or site.

Other preferred stable free radicals are those based on the hindered substituted diphenylpicrylhydrazine, and more preferably those substituted by electron-donating substituents, as for example, methoxy groups. Other preferred stable free radicals are those based on the hindered substituted iminoxy radicals, $R_1R_2C\!=\!N\!-\!O●$, and more preferably those where the R substituents are electron-donating substituents, as for example, methoxy groups, and even more preferably where the R substituents are substituted phenyl groups.

In embodiments, the present invention provides free radical reactive monomer polymerization processes for the preparation of thermoplastic resins or elastomer materials comprising heating from about 100° to about 250° C. for a time period of about 30 minutes to about 20 hours a mixture comprised of a free radical initiator (I—I), a stable free radical agent (SFR●) or equivalent precursor compound (SFR—H), at least one polymerizable monomer compound (M), and optionally a solvent, to form a product of the formula I—(M)$_n$—SFR comprised of a covalently bound free radical initiator fragment (I●) at one end, a covalently bound stable free radical compound (SFR●) at the other end of the product, and with polymerized monomers (M)$_n$ disposed therebetween, where n is an integer from about 10 to about 20,000 and represents the number of monomers in the polymer, and wherein said stable free radical agent has high thermal, acidic, and photochemical stability; optionally cooling the reaction mixture; and optionally isolating, washing, and drying the resulting polymeric product, wherein the product possesses a narrow polydispersity of from about 1.0 to about 2.0, and preferably from about 1.0 to about 1.5, a modality of 1, and wherein a monomer to polymer conversion of from about 10 to about 100 percent is achieved.

The foregoing process can, in embodiments, be expanded to enable the formation of bimodal, multimodal, and the like thermoplastic resins or elastomers by for example, adding to the aforementioned first formed resin or elastomer product a second mixture comprised of a free radical initiator, a stable free radical agent, and at least one polymerizable monomer compound, wherein the polymerizable monomer compound of the second mixture contains the same or different monomer components from the polymerizable monomer compound of the original mixture, and the free radical initiator and the stable free radical agent of the second mixture are the same or different from the free radical initiator and the stable free radical agent of the first mixture, and wherein there is formed a combined mixture; heating the combined mixture to form a third mixture comprised of a mixture of product comprised of a first product resin formed from the first product and added the second monomer, and a second product resin formed exclusively from the second monomer; cooling the third mixture; optionally isolating the mixture of product resins from the third mixture, wherein the first product resin and the second product resin each possess a narrow polydispersity. The resulting mixture of products possesses a modality of 2. Higher modalities, for example, of from 3 to about 20 can be conveniently achieved, if desired, by the subsequent addition of additional fresh mixtures of monomer, free radical initiator, and a suitable stable free radical agent prior to a final cooling and isolation step. The resulting resins in the foregoing process, in embodiments can be, for example, a bimodal mixture of a first product resin comprising a diblock copolymer comprised of a first polymer segment containing a block derived from a first monomer and a second block arising from the second monomer mixture, and a second product resin comprised of a homopolymer derived from substantially only the second monomer mixture. In a specific illustrative example, reaction by heating a mixture of n-butyl acrylate, benzoyl peroxide free radical initiator, and 2,4,6-tri-tert-butylphenoxy stable free radical agent affords a first product resin of poly(n-butylacrylate); further addition of a second monomer such as styrene, additional free radical initiator, and additional phenoxy derived stable free radical compound followed by, or concurrent with, heating provides the product resin mixture of poly(n-butyl acrylate-b-styrene) and homopolystyrene, wherein the homopolystyrene product is of comparable molecular weight to the styrene block segment incorporated into the accompanying poly(butyl acrylate-b-styrene) block copolymer. The product resins each have a covalently bonded benzoyl fragment at one end arising from the free radical initiator and a covalently bonded phenoxy group arising from the stable free radical agent at the other end of the polymer molecules.

In other embodiments of the present invention, there are provided polymerization processes for the preparation of diblock thermoplastic resin comprising: adding to aforementioned first formed thermoplastic resin, either in situ or in a separate reaction vessel, a second mixture containing only monomer comprised of at least one polymerizable monomer compound, wherein the polymerizable monomer compound of the second mixture contains different monomer components from the polymerizable monomer compound of the first polymerized mixture, and wherein there is formed a combined mixture; heating the combined mixture to form a third mixture comprised of a diblock copolymer product comprised of a first product resin formed from the first thermoplastic resin and the second monomer; cooling the third mixture; optionally isolating the diblock copolymer thermoplastic resin product from the third mixture and wherein the diblock copolymer thermoplastic resin possesses a narrow polydispersity.

In still other embodiments of the present invention, there are provided homopolymer and copolymer polymerization processes for the preparation of monomodal multiblock copolymer thermoplastic resin comprising: heating a first mixture comprised of a free radical initiator, a suitable stable free radical agent, and at least one polymerizable monomer compound to form a first intermediate product resin; adding to the first intermediate product resin a second mixture comprised of at least one polymerizable monomer compound, wherein the polymerizable monomer compound of the second mixture is different from the polymerizable monomer compound of the first mixture, to form a combined mixture; heating the combined mixture to form a third mixture comprised of a block copolymer thermoplastic resin comprised of a first product resin formed from the first intermediate product resin and added the second monomer; cooling the third mixture; and sequentially repeating the preceding steps of adding, heating and cooling, N times, to form a fourth mixture containing a multiblock copolymer thermoplastic resin having N+2 blocks and wherein N is a number representing the number of times the adding and heating sequence is repeated, and wherein the multiblock copolymer thermoplastic resin possesses a narrow polydispersity and a modality of 1. Added monomers can be water soluble, water insoluble, intermediate solubility, or soluble in both water and organic solvents. Judicious selection of the water solubility properties of added monomers and the resulting polymeric segment(s) enables convenient synthetic routes to block and multiblock copolymers with narrow polydispersities that are useful, for example, as surfactants and emulsifiers.

In yet other embodiments of the present invention, there are provided processes for polymerizing monomers comprising: (a) forming a reaction mixture by feeding into a reactor containing water or aqueous solutions with water miscible cosolvents; (i) one or more monomer solutions or suspensions thereof; (ii) a sterically hindered phenoxyl stable free radical compound derived from the corresponding phenol or any of the aforementioned suitable stable free radical compounds and derivatives thereof, or a solution thereof; and (iii) a free radical initiator, or a solution thereof, in an effective amount for initiating polymerization of the monomers; and (b) heating the reaction mixture from about 100° C. to about 250° C. to form a homopolymer or copolymeric resin with a narrow polydispersity and high with conversion. This process embodiment can be accomplished by adding one or more monomers, a free radical initiator, and a suitable stable free radical, such as a phenoxyl radical, simultaneously or sequentially in the order (i), (ii), and then (iii).

One class of monomers suitable for use in the present invention are carboxylic acid or acrylic monomers, that is $C_3-C_6$ monoethylenically unsaturated monocarboxylic acids, and the alkali metal and ammonium salts thereof. The $C_3-C_6$ monoethylenically unsaturated monocarboxylic acids include acrylic acid, methacrylic acid, crotonic acid, vinylacetic acid, and acryloxypropionic acid. Acrylic acid and methacrylic acid are the preferred monoethylenically unsaturated monocarboxylic acid monomers.

Another class of monomers suitable for the present invention are carboxylic acids, such as $C_4-C_6$ monoethylenically unsaturated dicarboxylic acids and the alkali metal and ammonium salts thereof, and the anhydrides of the cis dicarboxylic acids. Suitable examples include maleic acid, maleic anhydride, itaconic acid, mesaconic acid, fumaric acid, and citraconic acid. Maleic anhydride and itaconic acid are preferred monoethylenically unsaturated dicarboxylic acid monomers.

Acid containing monomers useful in this invention may be in their acid forms or in the form of the alkali metal or ammonium salts of the acid. Suitable bases useful for neutralizing the monomer acids include sodium hydroxide, ammonium hydroxide, potassium hydroxide, and the like. The acid monomers may be neutralized to a level of from 0 to 50 percent and preferably from 0 to about 20 percent.

More preferably, the carboxylic acid monomers are used in the completely neutralized form. Partial neutralization of the carboxylic acid monomers minimizes or eliminates corrosion on parts of the reaction equipment, but conversion of the monomers into polymer product may be diminished, for the aforementioned reasons. The acidic or labile proton containing monomers may be neutralized prior to, during, or after polymerization. The polymer products are often particularly useful in their partially or completely neutralized form.

In addition, the free radical reactive monomers that are useful in the present invention may be monoethylenically unsaturated carboxylic acid-free monomers. Suitable monoethylenically unsaturated carboxylic acid-free monomers can also be copolymerizable with the carboxylic containing monomers. Typical monoethylenically unsaturated carboxylic acid-free monomers which are suitable for this invention include alkyl esters of acrylic or methacrylic acids such as methyl acrylate, ethyl acrylate, butyl acrylate; hydroxyalkyl esters of acrylic or methacrylic acids such as hydroxyethyl acrylate, hydroxypropyl acrylate, hydroxyethyl methacrylate, and hydroxypropyl methacrylate; acrylamide, methacrylamide, N-tertiary butylacrylamide, N-methylacrylamide, N,N-dimethylacrylamide; acrylonitrile, methacrylonitrile, dimethylaminoethyl acrylate, dimethylaminoethyl methacrylate, phosphoethyl methacrylate, N-vinylpyrrolidone, N-vinylformamide, N-vinylimidazole, vinyl acetate, styrene, hydroxylated styrenes, styrenesulfonic acid and salts thereof, vinylsulfonic acid and salts thereof, and 2-acrylamido-2-methylpropanesulfonic acid and salts thereof.

Monomers, polymers and copolymers containing the above mentioned acidic functionality can, in embodiments, be separated from one another or from the polymerization reaction mixture by, for example, changing the pH of the reaction media and other well known conventional separation techniques.

Other suitable comonomers include acrylamides, alkyl and aryl amide derivatives thereof, and quaternized alkyl and aryl acrylamide derivatives.

Suitable initiators for the processes of the present invention are any conventional free radical initiators which have a half-life of at least 1 second at the polymerization temperature. Preferably, the initiator will have a half life of from about 10 second to about 2 hours, more preferably from about 10 seconds to about 10 minutes at the polymerization reaction temperature. These initiators include, but are not limited to oxygen, hydrogen peroxide, certain alkyl hydroperoxides, dialkyl peroxides, peresters, percarbonates, peroxides, persulfates and azo initiators. Specific examples of some suitable initiators include hydrogen peroxide, t-butyl hydroperoxide, di-tertiary butyl peroxide, tertiary-amyl hydroperoxide, potassium persulfate, dibenzoyl peroxide, and methylethyl ketone peroxide. The initiators are normally used in amounts of from about 0.05 percent to about 33 percent based on the weight of total polymerizable monomer. A preferred range is from about 0.5 to about 20 percent by weight of the total polymerizable monomer. In embodiments, the molar ratio of monomer to stable free radical agent to free radical initiator compounds is from about 50:0.2:1.0 to about 20,000:2.5:1.0. Preferred free radical initiators do not react with or degrade the stable free radical compounds with the exception of the aforementioned in situ stable free radical generation resulting from the reaction of the stable free radical precursor compound with a free radical fragments species.

Redox initiators may also be selected. These initiators include, but are not limited to, sodium bisulfite, sodium sulfite, isoascorbic acid, sodium formaldehyde-sulfoxylate, and the like, used with suitable oxidizing agents, such as the thermal initiators noted above. If used, the redox initiators may be used in amounts of 0.05 percent to 16 percent, based on the weight of total monomer. A preferred range is from about 0.5 to about 5 percent by weight of total monomer. Many of these initiators introduce undesired salt by-products into the polymer product. Thus it is preferred that the level of these initiators, if used, be minimized.

The stable free radical compound or agent selected for use in the present invention may be any known stable free radical agent which enables the objects and improvements of the present invention to be achieved. The aforementioned copending applications and commonly assigned patents disclose various stable free radical agents, including 2,2,6,6-tetramethy-1-piperidinyloxy free radical (TEMPO), and related nitroxyl stable free radical compounds. However, surprisingly and unexpectedly, the aforementioned nitroxyl stable free radical compounds, and related derivatives, while quite satisfactory for the purpose of moderating the polymerization of a wide variety of different monomer and comonomer types, these compounds were found to be less effective at either higher temperatures or in the presence of acidic promoter compounds. The reduced effectiveness of the aforementioned nitroxyl stable free radical compounds at elevated temperatures or in the presence of acidic promoter compounds is believed to be attributable to known thermal and acidic instability, respectively, of these compounds. The instability of nitroxyl stable free radical compounds is documented in, for example, L. B. Volodarsky, V. A. Reznikov, and V. I. Ovcharenko, *Synthetic Chemistry of Stable Nitroxides,* CRC Press, Boca Raton, Fla., 1993 and also L. Berliner, *Spin Labeling Theory and Applications,* Academic Press, New York, 1976. The acidic instability of the nitroxide is believed to lead to, for example, conversion of the nitroxyl free radical functionality (=N—O●) to the corresponding ineffective hydroxyl amine compound (=N—OH).

A solution to the aforementioned problem of nitroxyl stable free radical compound thermal and acidic instability was achieved in the present invention by employing, for example, non-nitroxyl stable free radical compounds in the aforementioned elevated temperature or acidic stable free radical polymerization process conditions.

Although not desired to be limited by theory, it is believed that in order for stable free radical (SFR) compounds to function effectively in controlling free radical polymerization processes for the production of narrow polydispersities resins and elastomers, there are several critical conditions which the stable free radical compound must satisfy. One, for example, is that the SFR compound must form a stable bond, that is stable at temperatures less than about 60° to 100° C., with the free radical end of the growing polymer chain. Two, the bond between the SFR compound and the growing chain must be weak enough so that it is sufficiently thermally labile and thereby enabling the polymer-SFR bond to break in a reversible manner with heating to a reasonable reaction temperature. For polystyrene, for example, this reasonable temperature should ideally be below the boiling point of the monomer, for example, of about 150° C. If the polymer-SFR bond is too stable at elevated temperatures, then the rate of bond breakage is too low or slow, and the polymerization rate becomes much too slow to be economically and industrially viable. If the bond breakage is too rapid, then the polymerization process becomes uncontrolled to the extent that the polydispersity of the resin increases to the levels of polydispersities found in conventional free radical polymerization processes thereby defeating or negating the purpose of employing a stable free radical agent or alternatively the incipient polymer product may be able to spontaneously depolymerize leading to non polymeric products.

The stability of the polymer-SFR bond can be estimated by calculation of bond dissociation enthalpies from the accompanying hypothetical reaction scheme

using semi-emperical molecular orbital calculations. Table 1 shows that the

TABLE 1

Calculated Bond Strength with an Analog of a Growing Polystyrene Chain Radical

| Stable Free Radical | Bond Strength (kcal/mole) | Comments |
| --- | --- | --- |
| Benzoyloxy PhCO$_2$• | 80 | Bond too strong; acts an initiator species |
| iniferter [(CH$_3$)$_2$N](C=S)S• | 38 | Bond is strong; slow polymerization Not sufficiently hindered; acts an initiator |
| cyclic 6-membered nitroxide: TEMPO | 26 | Weak bond; hindered; slow rate below about 125° C. |
| cyclic 5-membered nitroxide: PROXYL | 10 | Very weak bond; more hindered and fast rate at about 100° C. |

TEMPO nitroxyl free radical compound does form a stable but relatively weak bond with an analog of a growing polystyrene chain, of about 26 kcal/mole that is thermally labile. Based on these calculations, it can be shown that TEMPO controls free radical polymerizations, generating polymers with narrow molecular weight distributions, but slowly below 125° C. These calculations also predicted that PROXYL nitroxide SFR forms an even less stable bond of 10 kcal/mole. It was shown experimentally that PROXYL free radical provides for a faster rate of monomer polymerization compared to the TEMPO free radical. The C—O bond of a nitroxide-polymer adduct, of about 10 to about 26 kcal/mole, is much weaker bond than that for the corresponding C—S thiocarbamate iniferter-polymer adducts disclosed in the literature, at about 37 to 44 kcal/mole, reference, for example, T. Otsu and M. Yoshida, *Makromol. Chem., Rapid Comm.,* 3, 127–132 (1982). The bond between the iniferter and the growing chain radical is too strong, so that polymerization rate is too slow to be useful. Similarly, benzoyloxy radicals, with a bond strength of about 80 kcal/mole, form a bond which is too stable to be thermally labile to be useful as a stable free radical agent in narrow polydispersity polymerization processes under the heating conditions of from about 100° to 250° C. Thus, as supported by the accompanying calculated bond strength energies in Table 1, bond strength values appear to be a good measure for evaluating various free radical species as potential stable free radical agent compounds for controlling molecular weight and polydispersity in stable free radical moderated polymerization processes while affording reasonable, that is industrially acceptable, polymerization rates.

Other problems associated with selecting stable free radical compounds for use in stable free radical mediated narrow polydispersity polymerization processes include the degree of molecular structure steric hindrance in the immediate vicinity of the stable free radical bearing atom. Iniferter compounds are not sterically hindered to any extent, and thus these compounds are themselves capable of initiating new polymerization species throughout a polymerization process, thereby leading to broadening of the molecular weight distributions. Thus it is not surprising that it has not been possible until recently to produce narrow polydispersity resins using iniferters, reference for example, Otsu et. al., *Macromolecules*, 25,5554–5556 (1992). Also, it should be evident from the above considerations that peroxides, such as benzoyl peroxide, are very good initiators, and thus will fail to give narrow polydispersity resins if peroxides were to be used in the role of a stable free radical compound, that is, peroxides readily initiate polymerization; the peroxide-polymer bond is relatively strong, relatively thermally robust, and essentially irreversible for the temperature range 100° to 250° C.; and the benzoyl radical species is relatively sterically unhindered.

Nitroxides are not known to be free radical initiators, on the contrary these compounds are known to be free radical scavengers or free radical inhibitors at lower temperatures, such as below 100° C. However, cyclic nitroxyl or nitroxide free radical compounds have other shortcomings, for example, TEMPO is plagued by competing side reactions such as ring opening, reductive elimination reactions, and the like reactions early on in polymerization processes additionally employing monomer and a free radical initiator such as benzoyl peroxide. The PROXYL compound has fewer side reactions than the TEMPO, but PROXYL is considerably more expensive than the TEMPO compound. In addition, many nitroxide compounds react with free radical initiators, such as bis azo compounds and benzoyl peroxide, in the absence of reactive monomer, and which undesirable side reaction unnecessarily consumes expensive nitroxide compounds and produces wasteful non polymeric byproducts.

Calculations in Table 2 show bond enthalpies between an analog

TABLE 2

Calculated Bond Strengths of Stable Free Radical Compounds of an Analog of a Growing Polystyrene Chain

| Stable Free Radical | Bond Strength (kcal/mole) |
|---|---|
| trinitrophenyl-N',N'-diphenyl-hydrazine | 61.4 |
| phenoxyl Ph-O● | 45.5 |
| benzoxolane radical (R,R$_1$, and R$_2$ = CH$_3$) | 37.8 |
| α-tocopherol radical derivative (PMC) | 37.4 |
| di-t-butylphenoxyl where | |
| X = H | 37.4 |
| p-OCH$_3$ | 35.8 |
| P-NO$_2$; and | 41.6 |
| p-CH$_3$ | 37.7 |
| dithiocarbamate initiators | 38–45 |
| nitroxides | 10–26 | or model compound of a growing polystyrene chain and stable free radical derivative compounds based on phenoxys, tocopherols, and benzoxolanes. The adduct bonds formed by these stable free radical derivatives are of lower energy or less stable than, for example, dithiocarbamate iniferters, but they are more stable than nitroxides. Therefore, these bonds are expected to break more readily than the corresponding iniferter adducts. but not as readily as the corresponding nitroxide adducts. The aforementioned bond strengths should be considered as calculated maximum values, as they can be lowered by, for example, the addition or inclusion of electron donating groups. As shown for di-tert-butyl substituted phenoxyl radical, the addition of a para substituent influences the polymer SFR bond strength. The sterically hindered phenoxyl radicals are not likely to initiate polymerization as they are too hindered and are well known as inhibitors and radical scavengers, similar to the nitroxide stable free radical compounds. Adding sterically hindering groups around or about the radical bearing atom reduces the likelihood that these compounds would induce free radical initiation of polymerization, and further reduces the possibility of side reactions on the aromatic nucleus at these sites and reduces the bond strength between the stable free radical agent and the polymer chain. Thus, free radical compounds that satisfy the above mentioned requirements, such as bond strength and steric hindrance about the free radical center are considered preferred alternatives to nitroxide stable free radical compounds to achieve narrow polydispersity resins in stable free radical mediated processes. Many of these alternative materials are relatively inexpensive and are readily commercially available compared to nitroxide compounds. Commercially available precursor materials, from for example, Aldrich Chemical in amounts less than about 1 kg include: 2,6-di-t-butyl-4-methylphenol ($27/kg); 2,4,6-tri-t-butylphenol ($89/kg); 2,6-di-t-butyl-4-methoxyphenol, α-tocopherol or Vitamin E ($200/kg); and 2,2,5,7,8-pentamethyl-6-chromanol or PMC. In contrast, TEMPO, the least expensive nitroxide available from Aldrich, is about $4,000 per kilogram. The free radical center or species can be introduced into the aforementioned alternative stable free radical precursor materials by reaction with initiators such as benzoyl peroxide and the like reactants. Triphenyl hydrazine compounds, such as trinitrophenyl-N',N'-diphenylhydrazine (DPPH), are also believed to be useful as stable free radical compounds for the polymerization processes of the present invention and for those derivatives with suitably strong electron donating groups which provide a sufficiently low bond strength between the DPPH and the polymer species.

Although not desired to be limited by theory, the calculations also suggest that with all other factors being equal, the lower the bond dissociation energy the more labile the polymer-SFR or C—O bond is and the reaction should proceed at a faster rate at a given temperature. In addition, the calculations also correctly predict that stable free radicals have an endothermic enthalpy of reaction with styrene monomer and thus are incapable of initiating new polymer chains which enthalpy condition is believed to be a requirement for a living polymerization system to give narrow molecular weight distributions.

Hydrophilic nitroxide stable free radical compounds are known, for example U.S. Pat. No. 5,264,204, discloses a magnetic resonance organ and tissue imaging method using these compounds, and a number of other suitable stable free radical compounds are available commercially and are readily accessible synthetically, for example, as disclosed in "Synthetic Chemistry of Stable Nitroxides", by L. B. Volodarsky et al., CRC Press, 1993, ISBN:0-8493-4590-1, the disclosures of which are incorporated by reference herein in their entirety. Various suitable hindered carbon-oxygen (C—O●) and related analog compounds of the nitroxide stable free radical compounds (N—O●) which satisfy the necessary stability and reactivity requirements are readily evident from a detailed review of the aforementioned references and in combination with the disclosures of the present invention.

The monomers of the present invention can be polymerized in a variety of polymerization reaction media. The reaction mixture may contain from about 95 to about 98 percent by weight, preferably from about 5 to about 90 percent by weight, and most preferably from 10 to about 85 percent by weight monomer with the balance comprised of other reactants, reagents, comonomers, and optional solvents, diluents, or additives.

The improved polymerization reactions of the present invention can be supplemented with a solvent or cosolvent if desired to help ensure that the reaction mixture or at least the monomer containing portion remains a homogeneous single phase throughout the monomer conversion. Any solvent or cosolvent may be selected so long as the solvent media is effective in providing a solvent system which avoids precipitation or phase separation of the reactants or polymer products until after all the solution polymerization reactions have been completed. Exemplary solvent or cosolvents useful in the present invention may be selected from the group consisting of polymer product compatible aliphatic alcohols, glycols, ethers, glycol ethers, pyrrolidines, N-alkyl pyrrolidinones, N-alkyl pyrrolidones, polyethylene glycols, polypropylene glycols, amides, carboxylic acids and salts thereof, esters, organosulfides, sulfoxides, sulfones, alcohol derivatives, hydroxyether derivatives such as butyl CARBITOL® or CELLOSOLVE®, amino alcohols, ketones, and the like, derivatives thereof, and mixtures thereof. Specific examples include ethylene glycol, propylene glycol, diethylene glycol, glycerine, dipropylene glycol, tetrahydrofuran, and the like, and mixtures thereof. When mixtures of water and water soluble or miscible organic liquids are selected as the reaction media, the water to cosolvent weight ratio typically ranges from about 100:0 to about 10:90, and preferably from about 97:3 to about 25:75.

Temperature of the polymerization may range from about 100° C. to about 250° C., preferably from about 110° C. to about 180° C. At temperatures below about 100° C., the reaction rate is slow and industrially impractical without the aid of an acid or base accelerating additive compound. At temperatures above about 250° C., conversion of the monomer into polymer decreases, and uncertain and undesirable by-products are formed. Frequently, these by-products discolor the polymer mixture and may necessitate a purification step to remove them or they may be intractable.

Since solvent and cosolvent admixtures can be used as the reaction media, the elevated temperatures of the polymerization require that the polymerization reactor be equipped to operate at elevated pressure. In general, it is preferred to conduct the polymerization at from about 10 to about 2,000 pounds per square inch (psi), and more preferably at from about 50 to about 1,000 psi.

The molecular weights referred to are measured by gel permeation chromatography using, for example, a polyethylene oxide standards for water soluble polymers and polystyrene standards for organic soluble polymers unless specifically stated otherwise.

Although not being desired to be limited by theory, it is believed that when polymerization reaction processes of the present invention are performed at a temperature at about or above 100° C., the exact temperature depending on the initiator used, all the polymer chains are expected to be initiated at about the same time. This is believed to be an important feature in forming polymer chain products having narrow polydispersities.

The aforementioned undesirable chain coupling or disproportionation termination reactions, so prevalent under the conditions of conventional art free radical polymerization systems, is believed to be suppressed under the conditions of the present invention because the effective instantaneous concentration and availability of living free chains is extremely small. In addition, stable free radical agents of the instant invention do not initiate polymerization so that new chains are not initiated after an initial period of less than about 1 to 2 hours during which time all polymer chains are initiated at about the same time.

Propagating chains of the present invention are referred to as pseudoliving because the stable free radical agent adds to a propagating chain and the chain is temporarily, but reversibly, terminated, reference the aforementioned U.S. Pat. No. 5,322,912. The term "protected" as used therein refers, for example, to the availability of the polymer chain radical species for selective rather than indiscriminant further reaction with monomer. An unmoderated free radical polymerization chain, that is, a free radical polymerization process without a stable free radical agent present as a reversible blocking group, in contrast, has a reactive or "open" polymer chain end throughout its lifetime which is typically irreversibly terminated on the order of seconds.

The present invention provides several specific advantages in embodiments as follows.

With the process of the present invention, polymer product polydispersities can be varied from between approximately 1.0 to approximately 2.0, or lower or higher if desired depending on the monomer/comonomer system by varying the ratio of stable free radical agent to free radical initiator molar concentration. When the polymerization process conditions of the present invention are attempted with bulky or sterically hindered, for example, alkyl acrylate type monomers without using the a stable free radical (SFR) agent additive, considerably broader molecular weight resins are obtained and autopolymerization effects are observed, or alternatively, no product polymer is formed.

During the reaction of monomer or mixtures of monomers to form polymers, the reaction time may be varied over about 30 minutes to 60 hours, preferably between about 2 to 10 hours and optimally about 3 to 7 hours. The optimal reaction time may vary depending upon the temperature, the volume and scale of the reaction, and the quantity and type of polymerization initiator and stable free radical agent selected.

The polymerization reaction temperature is preferably kept relatively constant throughout the heating of the reaction mixture by providing an adjustable external heat source and the temperature is from about 60° C. to about 250° C., and preferably between 100° C. and 200° C. and optimally in embodiments about 110° C. to 180° C. Reactions performed above 250° C. tend to result in a broadening of the polydispersity. A reaction volume may be selected for any size that enables simple adding, mixing, reacting and isolating the product resins on an economic or convenient scale.

The free radical initiator can be any free radical polymerization initiator capable of initiating a free radical polymerization process of unsaturated monomers and includes peroxide initiators such as benzoyl peroxide, persulfate initiators such as potassium persulfate, azo initiators such as azobisisobutyronitrile, and the like. The initiator concentration employed is, for example, about 0.2 to about 16.0 weight percent of the total weight of monomer to be polymerized and is determined by the desired molecular weight of the resin. As the initiator concentration is decreased relative to the weight or molar equivalents of monomer used, the molecular weight or the thermoplastic resin or elastomer product increases.

Water soluble free radical initiators can be optionally employed in the processes of this invention and are those that are traditionally used in aqueous polymerization. Examples of water soluble free radical initiators are: persulfates; water soluble peroxides and hydroperoxides; more specifically, sodium, potassium and ammonium persulfate; peroxides such as hydrogen peroxide, t-butyl hydroperoxide, cumene hydroperoxide, paramenthane hydroperoxide; and peroxy carbonates. Other water soluble initiators of similar decomposition mechanism may be used if desired.

A preferred initiator is one which has a one-hour half-life at about 60° to 95° C. and a ten-hour half-life at about 50° to 80° C. Other peroxides, such as peresters and peracids having somewhat higher one-hour half-life/temperature relationships, may also be used if they are accompanied by a promoter compound such as tertiary amine. Such initiators are, for example: 2,4-dimethyl-2,5-dibenzyl peroxyhexane (138° C.), tert-butyl peroxybenzoate (125° C.), di-tert-butyl diperoxyphthalate (123° C.), methyl ethyl ketone peroxide (133° C.), dicumyl peroxide (135° C.) tert-butyl peroxycrotonate (118° C.), 2,2-bis-t-butyl(peroxybutane) (119° C.), tert-butylperoxy isopropyl carbonate (119° C.), 2,5-dimethyl-2,5-bis(benzoylperoxy)-hexane (118° C.), t-butyl peracetate (120° C.), di-t-butyldiperoxy-phthalate (123° C.), and the like. The figures in parentheses are the 1 hour half-life temperatures.

Still other initiators may also be employed if accompanied by a promoter compound in versions of this process, for example, 2,4-pentanedione peroxide (167° C.), di-t-butyl peroxide (149° C.), 2,5-dimethyl-2,5-di(t-butylperoxy)-hexyne (149° C.), 2,5-dimethyl-2,5-di(t-butylperoxy)hexyne (149° C.), 2,5-dimethyl-2,5-di(t-butylperoxy) hexane (138° C.), and the like.

Preferred initiator compounds are: t-butyl peroxy isobutyrate (120° C.); t-butyl peroxy 2-ethylhexanoate (95° C.); t-butyl pivalate (76° C.); and t-amyl peroxy 2-ethyl hexanoate (92° C.). Particularly preferred free radical initiators are azobisalkylnitrile and diaroyl peroxide compounds.

The monomer or monomers to be polymerized in embodiments can be dissolved in water or aqueous mixtures of polar protic or aprotic organic solvents. The resultant aqueous solution usually contains a suitable water-soluble, free-radical generating initiator such as a peroxide or a persulfate, and the like, as defined above. The monomer or monomers are used in effective amounts relative to the free radical initiator, and stable free radical agent, as defined hereinafter.

The stable free radical agent used for controlling polymerization processes of monomers or comonomers of the present invention can be any stable free radical compound which fulfills the above-mentioned criteria. These stable free radical agent materials are well known in the literature as free radical polymerization inhibitors or free radical scavengers, for example, the aforementioned sterically hindered and highly "stable" stable free radical compounds, reference *Macromolecules*, Vols I and II, H. G. Elias Ed., Plenum Publishers, Second Edition, New York, 1984. However, under the polymerization conditions of the present invention, the stable free radical agents function not as inhibitors but as moderators to harness the normally highly reactive and indiscriminate propagating intermediate free radical polymer chain species. Other suitable stable free radicals that may be used in conjunction with polymerizing monomers or comonomers in the polymerization processes of the present invention are disclosed in U.S. Pat. Nos. 3,600,169 and 5,324,604, the disclosures of which are incorporated by reference herein in their entirety. The stable free radical agents are preferably soluble in the monomer phase, where predominantly all the polymerization of monomers occurs. Stable free radical agents which have limited monomer solubility are still useful, but may require a monomer miscible cosolvent or else these stable free radical compounds tend to result in less predictable polymerization processes. If the stable free radical agent separates out of the monomer phase to any great extent then the balance desired between the mole ratio of the stable free radical agent, free radical initiator, and propagating free radical polymer chain species may be upset.

The molar ratio of the stable free radical (SFR) agent to free radical initiator (INIT) residing in the monomer phase is from about 0.5 to 5.0, and preferably in the range from about 0.4 to 4.0. Although not wanting to be limited by theory, in an embodiment, the molar ratio [SFR:INIT] of stable free radical agent, for example, 2,4,6-tri-tert-butyl phenoxy radical, to free radical initiator, for example, benzoyl peroxide is about 2.0 and is believed to be important for success of the process. If the [SFR:INIT] is too high then the reaction rate is noticeably inhibited. If the [SFR:INIT] is too low then the reaction product has undesired increased polydispersity. It should be noted that when alkyl acrylic acid or alkyl acrylate ester compounds are polymerized to polyalkylacrylate derivatives at comparatively high temperatures without the stable free radical agent of the present process, the product polymers isolated have polydispersities in excess of 2.0 and above.

In embodiments, the molar ratio of monomer content to stable free radical agent to free radical initiator is from about 6.0:0.2:1 to about 10,000:2.5:1 and preferably in the range of about 125:2.0:1 to about 7,000:1.3:1.

Processes of the present invention, in embodiments, provide for selective low, intermediate, and high monomer to polymer conversion rates, or degrees of polymerization, and preferably, for example, of 90 percent by weight or greater.

The low weight average molecular weight resin products having narrow polydispersity properties, as is also the situation with intermediate and high molecular weight products of the present invention, may be obtained without the use of a chain transfer agent.

Processes of the present invention, in embodiments also provide for relatively high weight average molecular weights, from weight average molecular weights ranging in size of from about 2,000 to about 200,000 while delivering narrow polydispersity products.

The monomers and comonomers that can be used in the present invention are any monomer capable of undergoing a free radical polymerization and include but are not limited to styrene, substituted styrenes and derivatives thereof, for example, hydroxylated and methylated styrenes, acrylates, butadiene, and any conjugated diene monomer sufficiently reactive under the aforespecified stable free radical moderated polymerization reaction conditions to afford a stable free radical reaction adduct and subsequently high molecular weight polymer products, for example, polymers of n-butyl acrylate, acrylic acid, and the like.

The polymerization reaction rate of the monomers may, in embodiments, be inhibited or accelerated and the reaction time influenced by the addition of a minor amount of a protic acid selected from the group consisting of inorganic acids, such as sulfuric, hydrochloric, and the like, and organic sulfonic and carboxylic acids. Although no definitive trend is presently evident, the added acid may have a profound or very little effect on the polymerization rate, depending upon a variety of reaction variables and conditions. Excessive addition of inorganic and organic acid beyond equimolar amounts compared to the stable free radical agent causes the resin polydispersity to broaden. In embodiments, the protic acid source may be in the form of an effective acid functional group contained in either the stable free radical agent or in the free radical initiator compound.

By cooling the polymerization reaction to below 60° to 80° C., the stable free radical moderated polymerization process is effectively quenched or terminated. Each new or subsequent addition of mixtures containing monomer, stable free radical, and initiator, accompanied by heating provides a new polymeric species having a narrow molecular weight distribution and each new polymer species continues to grow independently of the other polymer species already established thereby providing the capability of forming well defined, narrow polydispersity, bimodal and multimodal polymer mixtures. In the absence of continued heating, no new polymer product formation or chain elongation is observed.

Alternatively, block copolymer resins may also be prepared whereby after each desired block has been formed a new monomer or monomers is added, without the addition of more initiator or stable free radical agent, to form a new block wherein each block component is well defined in length and has a narrow molecular weight distribution and having properties depending on the repeated sequence and the monomers chosen for incorporation. Monomers added subsequent to the formation of the first formed thermoplastic resin or elastomer may be water soluble or water insoluble. Judicious selection of the water solubility properties of added monomers and the resulting polymeric segment enables convenient synthetic routes to block and multiblock copolymers with narrow polydispersities that are useful, for example, as surfactants, resin compatibilizers, viscosity modifies, and emulsifiers.

The polymeric products of the present invention may be optionally crosslinked with, for example, known crosslinking, coupling, or curing agents such as divinyl benzene and the like, either in situ or in a separate post polymerization process step.

Additional optional known additives may be used in the polymerization reactions which do not interfere with the objects of the invention and which may provide additional performance enhancements to the resulting product, for example, colorants, lubricants, release or transfer agents, surfactants, stabilizers, antifoams, antioxidants, and the like.

Polymer resins possessing a discrete mixture of monomodal, that is a well defined multimodal molecular weight distribution may in embodiments thereof provide several advantages, particularly for electrophotographic toner compositions such as: melt rheology properties including improved flow and elasticity; and improved performance properties such as triboelectrification, admix rates, and shelf life stabilities.

In the aforementioned U.S. Pat. No. 5,322,912, there is disclosed a monomer polymerized in bulk or in the absence of a solvent or diluent, that is neat, using a mixture of styrene monomer, a free radical initiator, and a stable free radical agent at constant temperature. A plot of weight percent monomer conversion versus number average molecular weight indicates that a nearly linear relationship holds for bulk polymerization reaction media using stable free radical agent moderated processes and which relationship is believed to be operative in the present invention. Thus, the Trommsdorff effect, that is, known exothermic heating or autoacceleration of the monomer conversion reaction rate and randomization of molecular weights observed in unmoderated free radical polymerization reactions is effectively suppressed in aqueous or nonaqueous polymerization processes of the present invention even at high solids content, high conversion, and elevated temperature free radical initiated polymerization reactions.

Toner compositions can be prepared by a number of known methods, such as admixing and heating resin particles obtained with the processes of the present invention such as water soluble styrene butadiene copolymer derivatives, pigment particles such as magnetite, carbon black, or mixtures thereof, and cyan, yellow, magenta, green, brown, red, or mixtures thereof, and preferably from about 0.5 percent to about 5 percent of charge enhancing additives in a toner extrusion device, such as the ZSK53 available from Werner Pfleiderer, and removing the formed toner composition from the device. Subsequent to cooling, the toner composition is subjected to grinding utilizing, for example, a Sturtevant micronizer for the purpose of achieving toner particles with a volume median diameter of less than about 25 microns, and preferably of from about 6 to about 12 microns, which diameters are determined by a Coulter Counter. Subsequently, the toner compositions can be classified utilizing, for example, a Donaldson Model B classifier for the purpose of removing toner fines, that is toner particles less than about 4 microns volume median diameter.

Illustrative examples of suitable toner resins selected for the toner and developer compositions of the present invention include styrene acrylates, styrene methacrylates, styrene butadienes, vinyl resins, including homopolymers and copolymers of two or more vinyl monomers; vinyl monomers include styrene, p-chlorostyrene, butadiene, isoprene, and myrcene; vinyl esters like esters of monocarboxylic acids including methyl acrylate, ethyl acrylate, n-butyl acrylate, isobutyl acrylate, dodecyl acrylate, n-octyl acrylate, phenyl acrylate, methyl methacrylate, ethyl methacrylate, and butyl methacrylate; acrylonitrile, methacrylonitrile, acrylamide; and the like. Preferred toner resins include styrene butadiene copolymers, mixtures thereof, and the like. Other preferred toner resins include styrene/n-butyl acrylate copolymers, PLIOLITES®; suspension polymerized styrene butadienes, reference U.S. Pat. No. 4,558,108, the disclosure of which is totally incorporated herein by reference.

In toner compositions, the resin particles are present in a sufficient but effective amount, for example from about 70 to about 90 weight percent. Thus, when 1 percent by weight of the charge enhancing additive is present, and 10 percent by weight of pigment or colorant, such as carbon black, is contained therein, about 89 percent by weight of resin is selected. Also, the charge enhancing additive may be coated on the pigment particle. When used as a coating, the charge enhancing additive is present in an amount of from about 0.1 weight percent to about 5 weight percent, and preferably from about 0.3 weight percent to about 1 weight percent.

Numerous well known suitable pigments or dyes can be selected as the colorant for the toner particles including, for example, carbon black like REGAL 330®, nigrosine dye, aniline blue, magnetite, or mixtures thereof. The pigment, which is preferably carbon black, should be present in a sufficient amount to render the toner composition highly colored. Generally, the pigment particles are present in amounts of from about 1 percent by weight to about 20 percent by weight, and preferably from about 2 to about 10 weight percent based on the total weight of the toner composition; however, lesser or greater amounts of pigment particles can be selected.

When the pigment particles are comprised of magnetites, thereby enabling single component toners in some instances, which magnetites are a mixture of iron oxides ($FeO \cdot Fe_2O_3$) including those commercially available as Mapico Black, they are present in the toner composition in an amount of from about 10 percent by weight to about 70 percent by weight, and preferably in an amount of from about 10 percent by weight to about 50 percent by weight. Mixtures of carbon black and magnetite with from about 1 to about 15 weight percent of carbon black, and preferably from about 2 to about 6 weight percent of carbon black, and magnetite, such as MAPICO BLACK®, in an amount of, for example, from about 5 to about 60, and preferably from about 10 to about 50 weight percent can be selected.

There can also be blended with the toner compositions of the present invention external additive particles including flow aid additives, which additives are usually present on the surface thereof. Examples of these additives include colloidal silicas, such as AEROSIL®, metal salts and metal salts of fatty acids inclusive of zinc stearate, aluminum oxides, cerium oxides, and mixtures thereof, which additives are generally present in an amount of from about 0.1 percent by weight to about 5 percent by weight, and preferably in an amount of from about 0.1 percent by weight to about 1 percent by weight. Several of the aforementioned additives are illustrated in U.S. Pat. Nos. 3,590,000 and 3,800,588, the disclosures of which are totally incorporated herein by reference.

With further respect to the present invention, colloidal silicas, such as AEROSIL®, can be surface treated with the charge additives in an amount of from about 1 to about 30 weight percent and preferably 10 weight percent followed by the addition thereof to the toner in an amount of from 0.1 to 10 and preferably 0.1 to 1 weight percent.

Also, there can be included in the toner compositions low molecular weight waxes, such as polypropylenes and polyethylenes commercially available from Allied Chemical and Petrolite Corporation, EPOLENE N-15® commercially available from Eastman Chemical Products, Inc., VISCOL 550-P®, a low weight average molecular weight polypropylene available from Sanyo Kasei K.K., and similar materials. The commercially available polyethylenes selected have a molecular weight of from about 1,000 to about 1,500, while the commercially available polypropylenes utilized for the toner compositions are believed to have a molecular weight of from about 4,000 to about 5,000. Many of the polyethylene and polypropylene compositions useful in the present invention are illustrated in British Patent No. 1,442,835, the disclosure of which is totally incorporated herein by reference.

The low molecular weight wax materials are optionally present in the toner composition or the polymer resin beads of the present invention in various amounts, however, generally these waxes are present in the toner composition in an amount of from about 1 percent by weight to about 15 percent by weight, and preferably in an amount of from about 2 percent by weight to about 10 percent by weight and may in embodiments function as fuser roll release agents.

Encompassed within the scope of the present invention are colored toner and developer compositions comprised of toner resin particles, carrier particles, the charge enhancing additives illustrated herein, and as pigments or colorants red, blue, green, brown, magenta, cyan and/or yellow particles, as well as mixtures thereof. More specifically, with regard to the generation of color images utilizing a developer composition with charge enhancing additives, illustrative examples of magenta materials that may be selected as pigments include, for example, 2,9-dimethyl-substituted quinacridone and anthraquinone dye identified in the Color Index as CI 60710, CI Dispersed Red 15, diazo dye identified in the Color Index as CI 26050, CI Solvent Red 19, and the like. Illustrative examples of cyan materials that may be used as pigments include copper tetra-4-(octadecyl sulfonamido) phthalocyanine, X-copper phthalocyanine pigment listed in the Color Index as CI 74160, CI Pigment Blue, and Anthrathrene Blue, identified in the Color Index as CI 69810, Special Blue X-2137, and the like; while illustrative examples of yellow pigments that may be selected are diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33, 2,5-dimethoxy-4-sulfonanilide phenylazo-4'-chloro-2,5-dimethoxy acetoacetanilide, and Permanent Yellow FGL. The aforementioned pigments are incorporated into the toner composition in various suitable effective amounts providing the objectives of the present invention are achieved. In one embodiment, these colored pigment particles are present in the toner composition in an amount of from about 2 percent by weight to about 15 percent by weight calculated on the weight of the toner resin particles.

For the formulation of developer compositions, there are mixed with the toner particles carrier components, particularly those that are capable of triboelectrically assuming an opposite polarity to that of the toner composition. Accordingly, the carrier particles are selected to be of a negative polarity enabling the toner particles, which are positively charged, to adhere to and surround the carrier particles. Illustrative examples of carrier particles include iron powder, steel, nickel, iron, ferrites, including copper zinc ferrites, and the like. Additionally, there can be selected as carrier particles nickel berry carriers as illustrated in U.S. Pat. No. 3,847,604, the disclosure of which is totally incorporated herein by reference. The selected carrier particles can be used with or without a coating, the coating generally containing terpolymers of styrene, methylmethacrylate, and a silane, such as triethoxy silane, reference U.S. Pat. No. 3,526,533, U.S. Pat. No. 4,937,166, and U.S. Pat. No. 4,935,326, the disclosures of which are totally incorporated herein by reference, including for example KYNAR® and polymethylmethacrylate mixtures (40/60). Coating weights can vary as indicated herein; generally, however, from about 0.3 to about 2, and preferably from about 0.5 to about 1.5 weight percent coating weight is selected.

Furthermore, the diameter of the carrier particles, preferably spherical in shape, is generally from about 50 microns to about 1,000 microns, and in embodiments about 175 microns thereby permitting them to possess sufficient density and inertia to avoid adherence to the electrostatic images during the development process. The carrier component can be mixed with the toner composition in various suitable combinations, however, best results are obtained when about 1 to 5 parts per toner to about 10 parts to about 200 parts by weight of carrier are selected.

The toner composition of the present invention can be prepared by a number of known methods as indicated herein including extrusion melt blending the toner resin particles, pigment particles or colorants, and a charge enhancing additive, followed by mechanical attrition. Other methods include those well known in the art such as spray drying, melt dispersion, emulsion aggregation, and extrusion processing. Also, as indicated herein the toner composition without the charge enhancing additive in the bulk toner can be prepared, followed by the addition of charge additive surface treated colloidal silicas.

The toner and developer compositions may be selected for use in electrostatographic imaging apparatuses containing therein conventional photoreceptors providing that they are capable of being charged positively or negatively. Thus, the toner and developer compositions can be used with layered photoreceptors that are capable of being charged negatively, such as those described in U.S. Pat. No. 4,265,990, the disclosure of which is totally incorporated herein by reference. Illustrative examples of inorganic photoreceptors that may be selected for imaging and printing processes include selenium; selenium alloys, such as selenium arsenic, selenium tellurium and the like; halogen doped selenium substances; and halogen doped selenium alloys.

The toner compositions are usually jetted and classified subsequent to preparation to enable toner particles with a preferred average diameter of from about 5 to about 25 microns, and more preferably from about 8 to about 12 microns. Also, the toner compositions preferably possess a triboelectric charge of from about 0.1 to about 2 femtocoulombs per micron as determined by the known charge spectrograph. Admix time for toners are preferably from about 5 seconds to 1 minute, and more specifically from about 5 to about 15 seconds as determined by the known charge spectrograph. These toner compositions with rapid admix characteristics enable, for example, the development of images in electrophotographic imaging apparatuses, which images have substantially no background deposits thereon, even at high toner dispensing rates in some instances, for instance exceeding 20 grams per minute; and further, such toner compositions can be selected for high speed electrophotographic apparatuses, that is those exceeding 70 copies per minute.

Also, the toner compositions prepared from resins of the present invention possess desirable narrow charge distributions, optimal charging triboelectric values, preferably of from 10 to about 40, and more preferably from about 10 to about 35 microcoulombs per gram as determined by the known Faraday Cage methods with from about 0.1 to about 5 weight percent in one embodiment of the charge enhancing additive; and rapid admix charging times as determined in the charge spectrograph of less than 15 seconds, and more preferably in some embodiments from about 1 to about 14 seconds.

The following Examples are being supplied to further define various species of the present invention, it being noted that these Examples are intended to illustrate and not limit the scope of the present invention. Parts and percentages are by weight unless otherwise indicated.

EXAMPLE I

Phenoxy Stable Free Radical Moderated Polymerization of n-Butyl Acrylate n-Butyl acrylate monomer (5 mL), AIBN free radical initiator (100 mg) and 2,4,6-tri-tert-butyl phenoxy stable free radical (84 mg) are mixed together and heated in an oil bath maintained at a temperature of 165° C., under argon, for 3.5 hours. Samples (100 microliter aliquots) are removed at the time intervals and indicate that the molecular weights increase with time with no significant broadening of the polydispersity (PD).

EXAMPLE II

When Example I is repeated, with the exception that less AIBN free radical initiator is used, a higher molecular weight homopolymer of poly(n-butyl acrylate) resin can be obtained. Thus, when n-butyl acrylate (5 mL), AIBN (50 mg) and 2,4,6-tri-tert-butyl phenoxy stable free radical (84 mg) are mixed together and heated in an oil bath, under argon, for about 4 hours, a resin with approximately $M_n$=2,486, $M_w$=3,641, and PD=1.46 is obtained.

EXAMPLE III

When Example II is repeated, with the exception that about three times as much monomer is used, an even higher molecular weight poly(n-butyl acrylate) resin is obtained. Thus, when n-butyl acrylate (15 mL), AIBN (50 mg) and 2,4,6-tri-tert-butyl phenoxy stable free radical (84 mg) are mixed together and heated in an oil bath, under argon, for about 9 hours, a resin with approximately $M_n$=9,198, $M_w$=15,878 and PD=1.73 is obtained. Washing with methanol removes some oligomers to yield a thick oil with $M_n$=16,736, $M_w$=20,577, and PD=1.23.

EXAMPLE IV

When the polymerization is repeated with DMSO, as a polymerization solvent, a narrower polydispersity can be obtained. Thus, when n-butyl acrylate (10 mL), AIBN (50 mg) and 2,4,6-tri-tert-butyl phenoxy stable free radical (115 mg) in 20 mL of DMSO are mixed together and heated in an oil bath, under argon, for about 8 hours, a resin with $M_n$=6,577, $M_w$=8,923 and PD=1.36 is obtained. The same experiment conducted without DMSO present gives a polymer product with $M_n$=4,030, $M_w$=6,953, and PD=1.72.

EXAMPLE V

Galvinoxyl Stable Free Radical Modulated Polymerization of n-Butyl Acrylate n-Butyl acrylate (3 mL), AIBN free radical initiator (0.033 gm, 0.2 mmol) and galvinoxyl stable free radical (0.180 gm, 0.43 mmol, available from Aldrich Chemical Co.) were mixed together and heated in an oil bath, at about 145° C., under an argon atmosphere. The initial reaction mixture was a deep purple black color which gradually changed to a reddish brown as the reaction progressed. Samples (100 microliter aliqouts) were removed from the mixture and analyzed by GPC after 5 minutes and 65 minutes, respectively. The results shown in the accompanying table indicate an increase in both $M_w$ and $M_n$ and most notably a decrease in the polydispersity (PD).

| Sample | Time (min) | $M_w$ | $M_n$ | PD |
|---|---|---|---|---|
| 1 | 5 | 4,476 | 1,373 | 3.26 |
| 2 | 65 | 4,605 | 1,927 | 2.39 |

EXAMPLE VI

Example V was repeated with the exception that different amounts of galvinoxyl stable free radical were used at a lower temperature. Thus, when n-butyl acrylate (4 mL), AIBN (0.033 g, 0.2 mmol), and galvinoxyl in Reaction A using 0.129 gm, 0.3 mmol, or in Reaction B using 0.169 gm, 0.4 mmol, were heated in an oil bath at 125° C., Reaction A changed color after 3 minutes from very dark purple black to reddish brown, while Reaction B remained relatively dark throughout. Samples were removed and analyzed as indicated in the accompanying table with results indicating that the peak molecular weights of reaction A increased with increasing time, while for Reaction B the peak molecular weight remained essentially constant. Thus,

| Sample | Time (hr) | Reaction A (M$_w$) | Reaction B (M$_w$) |
| --- | --- | --- | --- |
| 1 | 1.25 | 366 | 191 |
| 2 | 2.25 | 408 | 191 |
| 3 | 5.25 | 618 | 191 |
| 4 | 7.25 | 827 | 191 | the ratio of the stable free radical (SFR) to the free radical initiator (I) appears too important to the relative rate of increase in the molecular weight of the polymer products.

EXAMPLE VII

When Example IV Reaction B was repeated, that is with galvinoxyl (0.169 gm, 0.4 mmol), the GPC results shown in the Table were obtained for the poly(n-butyl acrylate) polymer formed.

| Sample | Time (min) | M$_w$ | M$_n$ | PD |
| --- | --- | --- | --- | --- |
| 1 | 5 | 257 | 106 | 2.42 |
| 2 | 17 | 1,106 | 699 | 1.58 |

EXAMPLE VIII

Magnetic Toner Preparation and Evaluation

The polymer resin (74 weight percent of the total mixture) obtained by the stable free radical polymerization processes in Example I may be melt extruded with 10 weight percent of REGAL 330® carbon black and 16 weight percent of MAPICO BLACK® magnetite at 120° C., and the extrudate pulverized in a Waring blender and jetted to 8 micron number average sized particles. A positively charging magnetic toner may be prepared by surface treating the jetted toner (2 grams) with 0.12 gram of a 1:1 weight ratio of AEROSIL R972® (Degussa) and TP-302 a naphthalene sulfonate and quaternary ammonium salt (Nachem/Hodogaya SI) charge control agent.

Developer compositions may then be prepared by admixing 3.34 parts by weight of the aforementioned toner composition with 96.66 parts by weight of a carrier comprised of a steel core with a polymer mixture thereover containing 70 percent by weight of KYNAR®, a polyvinylidene fluoride, and 30 percent by weight of polymethyl methacrylate; the coating weight being about 0.9 percent. Cascade development may be used to develop a Xerox Model D photoreceptor using a "negative" target. The light exposure may be set between 5 and 10 seconds and a negative bias used to dark transfer the positive toned images from the photoreceptor to paper.

Fusing evaluations may be carried out with a Xerox Corporation 5028® soft silicone roll fuser, operated at 7.62 cm (3 inches) per second.

The minimum fix and hot offset temperatures of stable free radical polymerization polymers having narrow polydispersities as toners are expected to be improved over toners prepared from resins synthesized by a free radical polymerization process without a stable free radical agent present which afford broader polydispersities. The actual fuser roll temperatures may be determined using an Omega pyrometer and was checked with wax paper indicators. The degree to which a developed toner image adhered to paper after fusing is evaluated using a Scotch® tape test. The fix level is expected to be excellent and comparable to that fix obtained with toner compositions prepared from other methods for preparing toners having resins with high molecular weights and narrow polydispersities. Typically greater than 95 percent of the toner image remains fixed to the copy sheet after removing a tape strip as determined by a densitometer. Alternatively, the fixed level may be quantitated using the known crease test, reference the aforementioned U.S. Pat. No. 5,312,704.

Images may be developed in a xerographic imaging test fixture with a negatively charged layered imaging member comprised of a supporting substrate of aluminum, a photogenerating layer of trigonal selenium, and a charge transport layer of the aryl amine N,N'-diphenyl-N,N'-bis(3-methylphenyl)1,1'-biphenyl-4,4'-diamine, 45 weight percent, dispersed in 55 weight percent of the polycarbonate MAKROLON®, reference U.S. Pat. No. 4,265,990, the disclosure of which is totally incorporated herein by reference; images for toner compositions prepared from the copolymers derived from for example, Example XI are expected to be of excellent quality with no background deposits and of high resolution over an extended number of imaging cycles exceeding, it is believed, about 75,000 imaging cycles.

Other toner compositions may be readily prepared by conventional means from the polymer and copolymer resins of the present invention including colored toners, single component toners, multi-component toners, toners containing special performance additives, and the like.

The stable free radical agent moderated homo- and copolymeric polymerization processes of the present invention may be applied to a wide range of organic monomers to provide novel toner resin materials with desirable electrophotographic properties. For example, block copolymers have application as dispersants for photoreceptor pigments. The multimodal resins have application to low melt resins and certain monomodal resins may be used to modify the surface of carbon black and pigment particles to make the pigment particles more miscible with a host polymer or dispersing medium. Narrow molecular weight resins such as mixtures of poly(styrene-b-n-butyl acrylate) and poly(butyl acrylate) find application as improved toner resins for general application and particularly for detoning or deinking applications which may be achieved by heating at elevated temperatures in aqueous alkali solutions.

The aforementioned patents and publications are incorporated by reference herein in their entirety.

Other modifications of the present invention may occur to those skilled in the art based upon a review of the present application and these modifications, including equivalents thereof, are intended to be included within the scope of the present invention.

What is claimed is:

1. A polymer or copolymer resin composition obtained by the process comprising heating a mixture comprised of a free radical initiator, a non-nitroxide containing stable free radical agent selected from the group consisting of sterically hindered organic hydrazyls, organic verdazyls, pyridyl compounds, organic aroxyls, aryl alkyls and aryl cycloalkyls in which the unpaired electron is on a carbon atom in the alkyl or cycloalkyl group, and compatible mixtures thereof, at least one polymerizable monomer compound, and optionally a solvent, to form a polymer with a high monomer to polymer conversion of from about 50 to about 100 percent and a narrow polydispersity of from about 1.0 to about 2.0, wherein said polymer is comprised of a covalently bound free radical initiator fragment at one end and a covalently bound non-nitroxide containing stable free radical moiety at the other end of the polymer, and wherein said non-nitroxide containing stable free radical agent has high thermal, acidic, and photochemical stability which is greater than the corresponding nitroxide containing stable free radical agent and wherein said resins or elastomers have a weight average molecular weight ($M_w$) of from about 2,000 to 200,000 and a number average molecular weight ($M_n$) of from about 1,000 to about 100,000 and a polydispersity of about 1.0 to 2.0.

2. A toner composition comprised of pigment particles, and resin comprised of bimodal resins obtained from the polymerization comprising:

heating a mixture comprised of a free radical initiator, a non-nitroxide containing stable free radical agent, at least one polymerizable monomer compound, and optionally a solvent, to form a first polymer product with a high monomer to polymer conversion of from about 50 to about 100 percent and a narrow polydispersity of from about 1.0 to about 2.0, wherein said polymer is comprised of a covalently bound free radical initiator fragment at one end and a covalently bound non-nitroxide containing stable free radical moiety at the other end of the polymer, and wherein said non-nitroxide containing stable free radical agent has high thermal, acidic, and photochemical stability which is greater than the corresponding nitroxide containing stable free radical agent, wherein the first polymer product is a thermoplastic resin or elastomer and wherein the non-nitroxide containing stable free radical agent is comprised of a compound with a sterically hindered atom bearing a stable free radical, selected from the group consisting of sterically hindered organic hydrazyls, organic verdazyls, pyridinyl compounds, organic aroxyls, aryl alkyls and aryl cycloalkyls in which the unpaired electron is on a carbon atom in the alkyl or cycloalkyl group, and compatible mixtures thereof;

adding to said thermoplastic resin or elastomer a second mixture comprised of a free radical initiator, a stable free radical agent, and at least one polymerizable monomer compound, wherein said polymerizable monomer compound of said second mixture contains different monomer components from said polymerizable monomer compound of said heated mixture, and said free radical initiator and said stable free radical agent of said second mixture are the same or different from said free radical initiator and said stable free radical agent of said heated mixture, and wherein there is formed a combined mixture;

heating said combined mixture to form a third mixture comprised of a mixture of thermoplastic resins or elastomers comprised of a first polymer product and said added second monomer, and a second product resin formed from said second monomer;

cooling said third mixture; and optionally isolating the resulting thermoplastic product resin or elastomer from said third mixture, wherein said first product resin and said second product resin each possess a narrow polydispersity.

3. A toner composition comprised of pigment particles, and at least one resin obtained from the polymerization process comprising heating a mixture comprised of a free radical initiator, a non-nitroxide type stable free radical agent, at least one polymerizable monomer compound, and optionally a solvent, to form a polymer with a high monomer to polymer conversion of from about 50 to about 100 percent and a narrow polydispersity of from about 1.0 to about 2.0, wherein said polymer is comprised of a covalently bound free radical initiator fragment at one end and a covalently bound non-nitroxide type stable free radical moiety at the other end of the polymer, and wherein said non-nitroxide type stable free radical agent has high thermal, acidic, and photochemical stability which is greater than the corresponding nitroxide type stable free radical agent.

4. A thermoplastic polymer resin or elastomer of the formula

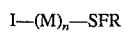

wherein I is a covalently bonded free radical initiator fragment, $(M)_n$ is at least one contiguous polymeric segment comprised of at least one free radical polymerized monomer compound M, n is an integer from about 10 to about 20,000 and represents the total number monomer units contained in the polymeric segment, and SFR is a covalently bonded non-nitroxide containing stable free radical agent selected from the group consisting of sterically hindered organic hydrazyls, organic verdazyls, pyridyl compounds, organic aroxyls, aryl alkyls and aryl cycloalkyls in which the unpaired electron is on a carbon atom in the alkyl or cycloalkyl group, and compatible mixtures thereof, wherein the stable free radical agent when bonded to the polymer or diassociated therefrom possesses thermal stability, acid stability, and photochemical stability, which is greater than that compared to a nitroxide containing stable free radical agent SFR group.

5. A polymer resin or elastomer in accordance with claim 4, wherein the stable free radical agent possesses high thermal stability, high acid stability, high photochemical stability, low toxicity, and high reactivity and high dissociability with propagating free radical polymeric species and is comprised of a sterically hindered stable free radical bearing atom, and is selected from highly substituted members of the group consisting of organic hydrazyls, organic verdazyls, pyridinyl compounds, organic aroxyls, aryl alkyls and aryl cycloalkyls in which the unpaired electron is on a carbon atom in the alkyl or cycloalkyl group, and compatible mixtures thereof.

6. A polymer resin or elastomer in accordance with claim 5 wherein the stable free radical agent is thermally stable up to about 250° to about 300° C.

7. A polymer resin or elastomer in accordance with claim 5 wherein the stable free radical agent is stable in aqueous acidic media at a pH of about 1.0 and above.

8. A polymer resin or elastomer in accordance with claim 5 wherein the stable free radical agent is photochemically stable when irradiated with wavelengths in the range from about 200 to about 800 nm.

9. A polymer resin or elastomer in accordance with claim 5 wherein the stable free radical agent has a low toxicity as measured by $LD_{50}$ (rats) of greater than about 500 to about 1,000 mg/kg.

10. A polymer resin or elastomer in accordance with claim 5 wherein the stable free radical agent bonded thereto or disassociated therefrom is substantially free of highly corrosive attributes compared to a nitroxide containing stable free radical agent SFR group.

11. A polymer resin or elastomer in accordance with claim 5 wherein the free radical agent of the stable free radical form is generated by oxidizing the corresponding protonated compound.

12. A polymer resin or elastomer in accordance with claim 5 wherein the stable free radical agent 2,4,6-tri-tert-butylphenoxy radical is selected.

13. A polymer resin or elastomer in accordance with claim 5 wherein the free radical form of the stable free racial agent has a half life of greater than about 10 hours at about 200° C. in the absence of polymerization reaction components selected from the group of monomer, polymer, and free radical initiator.

14. A polymer resin or elastomer in accordance with claim 4 wherein the free radical initiator fragment (I) arises from thermal or photochemical decomposition of the corresponding free radical precursor compound (I—I) selected from the group consisting of organic peroxides, organic persulfates, inorganic persulfates, peroxydisulfate, azobisalkylnitriles, peroxycarbonates, perborates, percarbonates, perchlorates, peracids, hydrogen peroxides, and mixtures thereof.

15. A polymer resin or elastomer in accordance with claim 4 wherein 2,4,6-tri-tert-butylphenoxy radical is selected as the stable free radical compound or agent.

16. A polymer resin or elastomer in accordance with claim 4 wherein dibenzoyl peroxide is selected as a free radical initiator component precursor (I—I) and which compound affords upon decomposition benzoyl peroxy radicals as the free radical initiator fragment I.

* * * * *